United States Patent
Iketani

(10) Patent No.: US 9,002,127 B2
(45) Date of Patent: Apr. 7, 2015

(54) IMAGE DYNAMIC RANGE COMPRESSION SYSTEM, METHOD AND PROGRAM

(75) Inventor: Akihiko Iketani, Tokyo (JP)

(73) Assignee: NEC Corporation, Tokyo (JP)

( * ) Notice: Subject to any disclaimer, the term of this patent is extended or adjusted under 35 U.S.C. 154(b) by 504 days.

(21) Appl. No.: 13/391,950

(22) PCT Filed: Jul. 5, 2010

(86) PCT No.: PCT/JP2010/004383
§ 371 (c)(1),
(2), (4) Date: Apr. 13, 2012

(87) PCT Pub. No.: WO2011/024370
PCT Pub. Date: Mar. 3, 2011

(65) Prior Publication Data
US 2012/0189206 A1    Jul. 26, 2012

(30) Foreign Application Priority Data
Aug. 24, 2009 (JP) .................. 2009-193123

(51) Int. Cl.
| | |
|---|---|
| G06K 9/40 | (2006.01) |
| H04N 1/407 | (2006.01) |
| G06T 5/00 | (2006.01) |
| H04N 1/409 | (2006.01) |
| H04N 19/30 | (2014.01) |

(Continued)

(52) U.S. Cl.
CPC .............. *H04N 1/4072* (2013.01); *G06T 5/004* (2013.01); *G06T 5/009* (2013.01); *H04N 1/4092* (2013.01); *H04N 19/30* (2014.11); *H04N 19/80* (2014.11); *H04N 19/98* (2014.11); *G06T 2207/10048* (2013.01)

(58) Field of Classification Search
None
See application file for complete search history.

(56) References Cited

U.S. PATENT DOCUMENTS

| | | |
|---|---|---|
| 6,678,400 B1 | 1/2004 | Shinbata |
| 2002/0136438 A1 | 9/2002 | Breeuwer |

(Continued)

FOREIGN PATENT DOCUMENTS

| | | |
|---|---|---|
| EP | 1675384 A2 | 6/2006 |
| GB | 2194706 A | 3/1988 |

(Continued)

OTHER PUBLICATIONS

Notification of Reasons for Refusal, dated Apr. 22, 2014, issued by the Japanese Patent Office, in counterpart Application No. 2011-528623.

(Continued)

*Primary Examiner* — Anand Bhatnagar
*Assistant Examiner* — Soo Park
(74) *Attorney, Agent, or Firm* — Sughrue Mion, PLLC

(57) ABSTRACT

There is provided an image dynamic range compression system which can compress a dynamic range for which the visibility of a low-frequency image is ensured while preserving a high-frequency image. An image converting unit converts an input image into a compressed image having a narrower dynamic range than the input image. A high-frequency image extracting unit extracts a high-frequency image from the input image. An image synthesizing unit synthesizes a compressed image and the high-frequency image. Further, by adaptively changing synthesizing method of ensuring the visibility of images to synthesize, the image synthesizing unit synthesizes these images.

8 Claims, 7 Drawing Sheets

(51) Int. Cl.
*H04N 19/80* (2014.01)
*H04N 19/98* (2014.01)

(56) References Cited

U.S. PATENT DOCUMENTS

2004/0071367 A1* 4/2004 Irani et al. .................. 382/284
2010/0309315 A1* 12/2010 Hogasten et al. ............ 348/164

FOREIGN PATENT DOCUMENTS

| JP | 11-98372 A | 4/1999 |
| JP | 2000-13629 A | 1/2000 |
| JP | 2000-316090 A | 11/2000 |
| JP | 2004-518474 A | 6/2004 |
| JP | 2005-304023 A | 10/2005 |
| JP | 2006-246200 A | 9/2006 |
| JP | 2007-274213 A | 10/2007 |
| JP | 2008-085633 A | 4/2008 |

OTHER PUBLICATIONS

Therrien, et. al.; "An Adaptive Technique for the Enhanced Fusion of Low-Light Visible with Uncooled Thermal Infrared Imagery"; Image Processing; Proceedings., International Conference on; Oct. 26, 1997; vol. 1; pp. 405-408.

Zhang et. al.; "Fusion of the Infrared and Color Visible Images Using Bidimensional EMD"; International Conference on MultiMedia and Information Technology; Dec. 30, 2008; pp. 257-260.

Supplementary European Search Report issued in European Application No. 10811429.9 dated Sep. 20, 2013.

Mikio Takagi, et al., "Handbook of Image Analysis [Revised Edition]", University of Tokyo Press, Sep. 2004, pp. 1172-1173, pp. 1176-1180.

Seth Weith-Glushko, et al., "Quantitative analysis of infrared contrast enhancement algorithms", Infrared Imaging Systems: Design, Analysis, Modeling, and Testing XVII, Proc. of SPIE, May 2007, pp. 1-12, vol. 6543, 65430S.

* cited by examiner

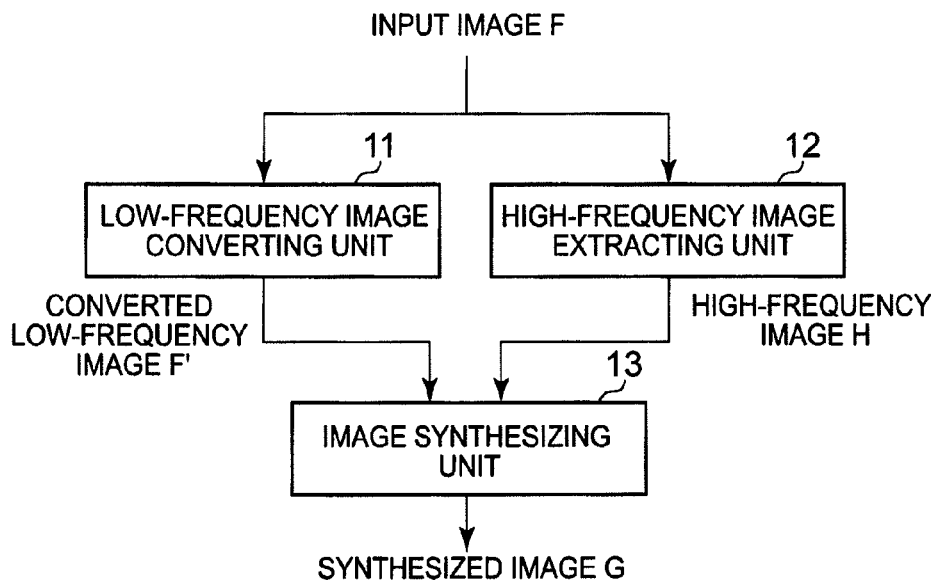
FIG. 1
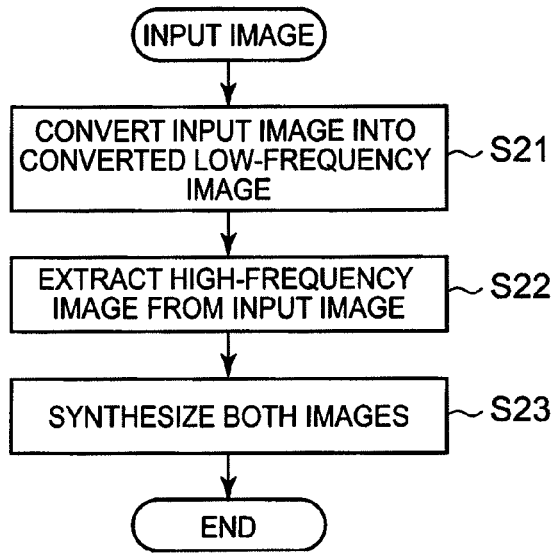
FIG. 2
FIG. 3

FIG. 16  $g(x,y)_{lp}$
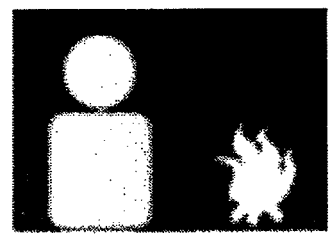
FIG. 17  $f(x,y)_{hp}$
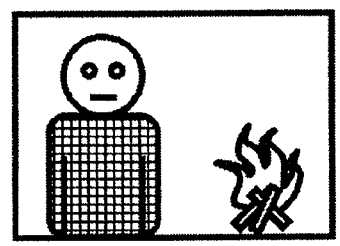
FIG. 18  $g(x,y)_{hp}$
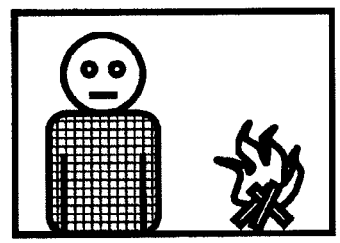
FIG. 19  $g(x,y)_1$
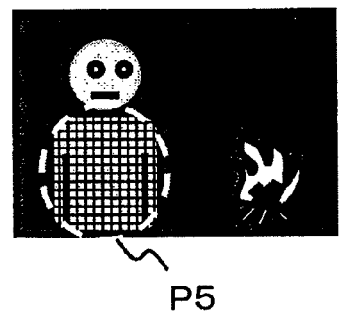
P5

IMAGE DYNAMIC RANGE COMPRESSION SYSTEM, METHOD AND PROGRAM

CROSS REFERENCE TO RELATED APPLICATIONS

This application is a National Stage of International Application No. PCT/JP2010/004383 filed Jul. 5, 2010, claiming priority based on Japanese Patent Application No. 2009-193123, filed Aug. 24, 2009, the contents of all of which are incorporated herein by reference in their entirety.

TECHNICAL FIELD

The present invention relates to an image dynamic range compression system, an image dynamic range compressing method and an image dynamic range compressing program which compress an image of a wide dynamic range to an image of a narrow dynamic range.

BACKGROUND ART

Various techniques are known of converting an image of a wide dynamic range (a range of a pixel value) such as an infrared image, and displaying the image on a display device of a narrow dynamic range.

For example, assume that an infrared image is captured by an infrared camera which can capture an image in a dynamic range of "the fourteenth power of 0 to 2". When this infrared image is displayed on a display device which can display an image in the dynamic range of "0 to 255", it is not possible to display this infrared image with a current pixel value. In this case, some conversion needs to be performed to display this infrared image on the display device. Thus, converting an image having a wide range of a pixel value into an image having a narrow range of a pixel value is referred to as "dynamic range compression".

In Non Patent Literature 1, linear scaling (linear conversion) of converting a gray level of an original image is described. Linear scaling is a method of linearly mapping a pixel value of an input image (an infrared image in the above example) in a range (0 to 255 in the above example) which the pixel value can be displayed by, for example, a display device. FIG. 8 is an explanatory view illustrating a conversion function for linearly mapping (that is, performing linear scaling) a pixel value of an infrared image. With a graph illustrated in FIG. 8, the horizontal axis indicates a pixel value on an infrared image, and the vertical axis indicates a pixel value on a converted image. FIG. 8 illustrates that the pixel value of the infrared image in the range of 0 to 10000 is converted into a pixel value in the range of 0 to 255. FIG. 9 illustrates an image converted by linear scaling. By changing the gray level area of an input image in this way, it is possible to display an image having a wide range of a pixel value, on a display device having a narrow range of a pixel value like the image illustrated in FIG. 9.

Further, Non Patent Literature 1 also discloses Histogram Equalization (hereinafter "HE"). HE refers to a technique of performing conversion (histogram conversion) in order that a distribution (hereinafter "histogram") of a frequency (the number of pixels) of each gray level in a given image becomes to be flat. Hereinafter, HE will be described using FIGS. 10 and 11. FIG. 10 is an explanatory view illustrating a brightness histogram of an image before conversion. Further, FIG. 11 is an explanatory view illustrating a (equalized) brightness histogram after conversion. In addition, in the following description, a pixel value is also referred to as a "brightness value". With graphs illustrated in FIGS. 10 and 11, the horizontal axis indicates a brightness value on an infrared image, and the vertical axis indicates an appearance frequency of a brightness value. With the image represented by the graph illustrated in FIG. 10, a frequency in the range of a low brightness value is high, and a frequency in the range of a high brightness value is low. Hence, an image is converted by applying HE to this image to equalize the distribution of the brightness value as illustrated in FIG. 11. FIG. 12 is an image converted by applying HE. With HE, each gray level is evenly used, and therefore the change of the shading of an image after processing becomes more obvious than an image before processing. Further, a method of applying HE in units of local blocks is referred to Adaptive Histogram Equalization (hereinafter "AHE"). By applying AHE, it is possible to adjust a contrast according to the gray level of each block with respect to, for example, an image having a fine shading per local block.

In Non Patent Literature 2, MEAM (the method according to Aare Mallo) is described. With MEAM, an input image is separated into a low-frequency image and a high-frequency image, linear scaling is applied to the low-frequency image, gain amplifying processing is applied to a high-frequency image and both images are finally superimposed. Hereinafter, MEAM will be described using FIGS. 13 to 19.

FIG. 13 is a flowchart illustrating processing in MEAN. Further, FIGS. 14 to 19 are explanatory views illustrating images converted by each processing. Hereinafter, a case will be described where MEAM is applied to an image of a wide dynamic range (for example, the fourteenth power of 0 to 2) illustrated in FIG. 14. First, a lowpass filter is applied to an image f(x,y) illustrated in FIG. 14 (step S91) to extract a low-frequency image $f(x,y)_{lp}$ (FIG. 15). Further, linear scaling is applied to the extracted low-frequency image $f(x,y)_{lp}$ to extract an image $g(x,y)_{lp}$ (FIG. 16) (step S92). On the other hand, a high-frequency image $f(x,y)_{hp}$ (FIG. 17) is extracted from the image f(x,y) illustrated in FIG. 14 (step S93). Further, gain amplification processing is applied to the extracted high-frequency image $f(x,y)_{hp}$ to extract an image $g(x,y)_{h}p$ (FIG. 18) (step S94). Finally, the extracted images $g(x,y)_{lp}$ and $g(x,y)_{hp}$ are added (step S95). The added image is an image $g(x,y)_1$ illustrated in FIG. 19. In addition, the image $g(x,y)_1$ is adjusted according to a range of a specified image (step S96). Thus, by using MEAM, it is possible to improve the contrast of images of the low-frequency image and the high-frequency image, and, consequently, compress the dynamic range while preserving edge information (information showing a location at which the brightness changes more rapidly than the surrounding) included more in the high-frequency image.

CITATION LIST

Non Patent Literature

NPL 1: "Handbook of Image Analysis [Revised Edition]", TAKAGI, Mikio, SHIMODA, Haruhisa, University of Tokyo Press, September, 2004, p. 1172 to 1173, p. 1176 to 1180

NPL 2: "Quantitative analysis of infrared contrast enhancement algorithms", "Infrared Imaging Systems:Design, Analysis, Modeling, and Testing XVIII (Proc. of SPIE)", Holst, Gerald C, (United States), May 2007, Vol. 6543, 65430S

SUMMARY OF INVENTION

Technical Problem

When the dynamic range is compressed by linear scaling, pixels in a level area in which the appearance frequency of a brightness value is high are compressed similar to pixels in a level area in which the appearance frequency of a brightness value is low, and therefore the contrast of the entire image is lost and there is a problem that what is shown becomes unclear. For example, in an image illustrated in FIG. 9, an area P1 includes a low-frequency image represented by pixels of a low-frequency having a high appearance frequency of a brightness value, and the area P2 includes a high-frequency image represented by pixels of a high-frequency having a low appearance frequency of a brightness value. According to linear scaling, a pixel value of a high-frequency image is linearly mapped, so that the observer can recognize a subject shown in the area P2. On the other hand, according to linear scaling, a pixel value of a low-frequency having a high appearance frequency of a brightness value is mapped similar to the pixel value of the high-frequency having a low appearance frequency of a brightness value, and therefore the contrast of the low-frequency image is lost. Therefore, the observer cannot recognize a subject shown in the area P1.

Further, when the dynamic range is compressed by HE, while it is possible to clarify the change of the shading, there is a problem that an area having a rare brightness drops in quality. For example, although most of low-frequency image portions which have been in black when linear scaling is applied become clear by applying HE, there is a problem that a bright area having a rare brightness drops in quality. For example, by applying HE, the subject in the area P1 which has been in black in the image illustrated in FIG. 9 becomes visible as shown in an area P3 in the image in FIG. 12. On the other hand, there is a problem that an area, such as a subject of an area P4 in the image, having a low appearance frequency of a brightness value drops in quality.

By applying MEAM, it is possible to overcome the above problems to some extent. However, according to MEAM, a converted low-frequency image and high-frequency image are simply added. Hence, there is a concern that a high-frequency image of an amplified gain is mixed in a low-frequency image, thereby spoiling the visibility of the synthesized image. Hereinafter, an example will be described using an image (hereinafter "temperature information") showing a brightness which changes according to the temperature of a subject similar to a thermograph. When a high-frequency image including a great number of pieces of edge information is superimposed on a low-frequency image such as this temperature information, the edge information is amplified, and therefore there is a concern that the visibility of the temperature information at a portion at which the edge information is superimposed is lost. For example, like the subject in an area P5 in an image in FIG. 19, when a high-frequency image including a great number of pieces of edge information such as a close texture is superimposed, there is a problem that the temperature information hides behind this edge information and becomes unrecognizable.

It is therefore an object of the present invention to provide an image dynamic range compression system, an image dynamic range method and an image dynamic range compressing program which can compress the dynamic range for which the visibility of a low-frequency image is ensured, while preserving a high-frequency image.

Solution to Problem

An image dynamic range compression system according to the present invention comprises: image converting means which converts an input image into a compressed image which dynamic range is narrower than that of the input image; high-frequency image extracting means for extracting a high-frequency image from the input image; and image synthesizing means for synthesizing a compressed image and a high-frequency image, and, by adaptively changing a synthesizing method of ensuring a visibility of images to synthesize, the image synthesizing means synthesizes the images.

An image dynamic range compressing method according to the present invention comprising: converting an input image into a compressed image having a narrower dynamic range than the input image; extracting a high-frequency image from the input image; and synthesizing a compressed image and the high-frequency image by adaptively changing a synthesizing method of ensuring a visibility of images to synthesize.

An image dynamic range compressing program according to the present invention causes a computer to execute: image converting processing of converting an input image into a compressed image having a narrower dynamic range than the input image; high-frequency image extracting processing of extracting a high-frequency image from the input image; and image synthesizing processing of synthesizing a compressed image and the high-frequency image, and, by adaptively changing a synthesizing method of ensuring a visibility of images to synthesize, the image synthesizing processing synthesizes the images.

Advantageous Effects of Invention

According to the present invention, it is possible to compress the dynamic range for which the visibility of a low-frequency image is ensured while preserving a high-frequency image.

BRIEF DESCRIPTION OF DRAWINGS

FIG. 1 It depicts a block diagram illustrating an example of an image dynamic range compression system according to a first exemplary embodiment.

FIG. 2 It depicts an explanatory view illustrating an example of a Laplacian filter.

FIG. 3 It depicts a flowchart illustrating an example of processing according to the first exemplary embodiment.

FIG. 16 It depicts an explanatory view illustrating an image $g(x,y)_{hp}$ converted from a low-frequency image.

FIG. 17 It depicts an explanatory view illustrating a high-frequency image $f(x,y)_{hp}$ of an input image.

FIG. 18 It depicts an explanatory view illustrating an image $g(x,y)_{hp}$ converted from a high-frequency image.

FIG. 19 It depicts an explanatory view illustrating an added image $g(x,y)_1$.

DESCRIPTION OF EXEMPLARY EMBODIMENTS

Figure 4:
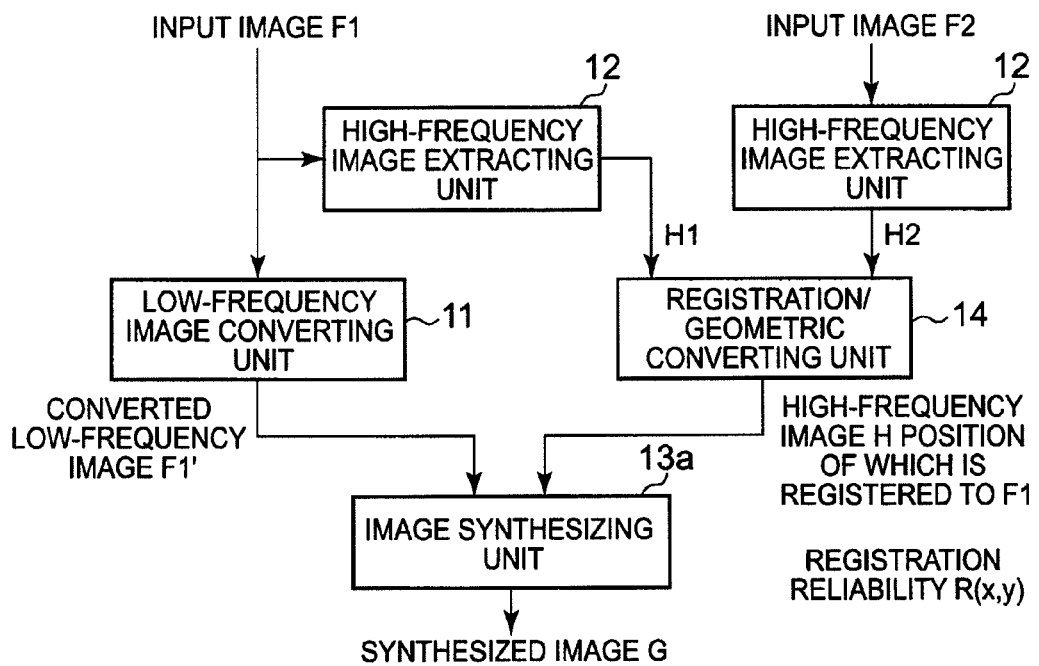
FIG. 4 It depicts a block diagram illustrating an example of an image dynamic range compression system according to a second exemplary embodiment.

Hereinafter, exemplary embodiments of the present invention will be described with reference to the drawings.

First Exemplary Embodiment

FIG. 1 is a block diagram illustrating an example of an image dynamic range compression system according to a first exemplary embodiment of the present invention. The image dynamic range compression system according to the present exemplary embodiment has a low-frequency image converting unit 11, a high-frequency image extracting unit 12 and an image synthesizing unit 13.

The low-frequency image converting unit 11 converts an input image F into an image (also referred to as "compressed image") having a narrower dynamic range than this input image. Meanwhile, conversion processing for images is processing performed independently per pixel. Hence, in the following description, F(x,y) indicates a pixel value in a coordinate (x,y) in an image. In addition, in the following description, the input image F is simply referred to as an "input image".

For example, by applying HE to the input image, the low-frequency image converting unit 11 may convert the input image in order that a distribution of a pixel value on a histogram becomes to be flat. However, the method of converting an input image is by no means limited to HE. In addition, the low-frequency image converting unit 11 may convert the input image by, for example, applying a lowpass filter to the input image, converting the input image into an image having a narrow dynamic range and applying linear scaling to the converted image.

In addition, the image obtained by linearly scaling the image obtained by applying the lowpass filter to the input image is more blurred than the image obtained by applying HE to the input image. Hence, from the view point of ensuring the visibility, it is more preferable that the low-frequency image converting unit 11 convert an input image by applying HE to the input image. In the following description, the image converted by the low-frequency image converting unit 11 is referred to as a "converted low-frequency image". When the low-frequency image converting unit 11 performs the above conversion processing, the contrast of a low-frequency image portion becomes clear, so that it is possible to improve the visibility.

The high-frequency image extracting unit 12 extracts a high-frequency image from an input image. By applying a Laplacian filter illustrated in FIG. 2 to the input image, the high-frequency image extracting unit 12 extracts a high-frequency image. More specifically, the high-frequency image extracting unit 12 multiplies nine upper, lower, left and right pixel values around a given pixel of interest, with coefficients illustrated in FIG. 2, and obtains a value obtained by adding these calculation results, as a value of the pixel of interest. The high-frequency image extracting unit 12 extracts a result of performing this processing with respect to each pixel of the input image, as a high-frequency image. Further, the high-frequency image extracting unit 12 may apply a lowpass filter to an image, and take a difference between the original image and an image to which the lowpass filter is applied. However, methods of extracting a high-frequency image are by no means limited to these methods. In addition, the high-frequency image extracting unit 12 Fourier-transforms an input image, performs filtering to cut a low-frequency portion from the converted frequency image, and then inverse-Fourier transforms the image to extract a high-frequency image. In addition, the high-frequency image extracting unit 12 extracts a high-frequency image from an input image, and therefore the high-frequency image extracting unit 12 may be referred to as a "highpass filter".

The image synthesizing unit 13 synthesizes the converted low-frequency image converted by the low-frequency image converting unit 11 and the high-frequency image extracted by the high-frequency image extracting unit 12. When these images are synthesized, the image synthesizing unit 13 adaptively changes a synthesizing method of ensuring the visibility of the converted low-frequency image and the high-frequency image.

Meanwhile, a case will be described as an example where a subject has a texture. When the high-frequency image extracted by the high-frequency image extracting unit 12 is superimposed as is on the converted low-frequency image (for example, HE image) converted by the low-frequency image converting unit 11, information of the HE image is hidden by edge information.

For example, assume that an infrared camera detects an area of an object having a very high temperature. However, when there are a great number of pieces of edge information in this area, if these pieces of edge information are superimposed as is, there is a concern that information of the high temperature area is hidden. In this case, even if an area with the high temperature needs to be recognized, there is a problem that this temperature information cannot be checked. Hence, the image synthesizing unit 13 ensures the visibility of a low-frequency image by converting at least one of the converted low-frequency image and the high-frequency image and superimposing both images.

More specifically, when a pixel value in a converted low-frequency image (for example, HE image) exceeds a predetermined threshold, the image synthesizing unit 13 multiplies a high-frequency component of the high-frequency image matching this pixel, with α (0<α<1). In addition, when the pixel value in the converted low-frequency image does not exceed the above threshold, the image synthesizing unit 13 does not change the high-frequency component of the high-frequency image matching the pixel. Further, the image synthesizing unit 13 synthesizes the converted image and the low-frequency image. Consequently, by synthesizing the high-frequency image obtained by weakening the high-frequency component according to content of the HE image, it is possible to prevent information of the HE image from being hidden by edge information.

In addition, the above threshold is determined according to a pixel value of a converted low-frequency image for which the visibility needs to be ensured. For example, when the pixel value matching the temperature is allocated to an input image, the user only needs to determine as a threshold a pixel value matching the temperature for which the visibility needs to be ensured. Further, a value (that is, a value) indicating the degree of decreasing a high-frequency component may be a value set in advance, or may be set according to a user's command.

With the above description, a case has been described where the image synthesizing unit 13 decreases a high-frequency component of a high-frequency image according to content of a converted low-frequency image. In addition, the image synthesizing unit 13 may change the synthesizing method to perform synthesis without losing both pieces of information of the converted low-frequency image and the high-frequency image. Hereinafter, a method of performing synthesis without losing information of both images will be described. The synthesis method described below is a method the image dynamic range compression system adopts to convert an infrared image into a pseudo color image according to a user's command.

First, the image synthesizing unit 13 generates a pseudo color image obtained by converting each pixel of the HE image into a color determined according to a pixel value. Further, the image synthesizing unit 13 converts the pseudo color image represented by the RGB color space, into a color space (for example, YCrCb space) in which a brightness component and a color component are independent, changes the brightness component of the pseudo color image according to the intensity of the high-frequency component of the high-frequency image matching the HE image (for example, replaces the brightness component of the pseudo color image with a value of the high-frequency image), and finally converts the color space into the original RGB color space. More specifically, the image synthesizing unit 13 sets the brightness higher for a pixel having a more intense high-frequency component. By performing synthesis in this way, it is possible to improve the visibility of edge information and ensure the visibility of a low-frequency image.

When the brightness component is changed according to the intensity of the high-frequency component, the image synthesizing unit 13 may change the brightness component based on an upper limit and a lower limit of the brightness set in advance. As described above, the image synthesizing unit 13 changes the brightness component based on the upper limit and the lower limit of the brightness, so that, even when the brightness component of the pseudo color image is replaced and a pixel has an intense high-frequency component, it is possible to prevent the brightness component of the pseudo color image to replace, from becoming too bright. Similarly, even for an image of a weak high-frequency component, it is possible to prevent the brightness component of the color image to replace, from becoming too dark.

In addition, a case has been described with the above description where the image synthesizing unit 13 sets the brightness higher for a pixel having a more intense high-frequency component. By contrast with this, the image synthesizing unit 13 may set the brightness lower for a pixel having a more intense high-frequency component. Further, when images are synthesized, the image synthesizing unit 13 may not only use the above synthesizing method alone, but also synthesize images using a plurality of synthesizing methods.

As described above, the image synthesizing unit 13 adaptively changes the synthesizing method according to images to synthesize, so that it is possible to ensure the visibility of a low-frequency image while preserving a high-frequency image.

The low-frequency image converting unit 11, the high-frequency image extracting unit 12 and the image synthesizing unit 13 are realized by a CPU of a computer which operates according to a program (image dynamic range compressing program). For example, the program is stored in a memory unit (not illustrated) of the image dynamic range compressing device, and the CPU reads the program and may operate as the low-frequency image converting unit 11, the high-frequency image extracting unit 12 and the image synthesizing unit 13 according to the program. Further, the low-frequency image converting unit 11, the high-frequency image extracting unit 12 and the image synthesizing unit 13 may be realized by dedicated hardwares, respectively.

Next, the operation will be described. FIG. 3 is an explanatory view illustrating an example of image dynamic range compressing processing according to the first exemplary embodiment. First, the low-frequency image converting unit 11 converts the input image F into a converted low-frequency image F' (step S21). Further, the high-frequency image extracting unit 12 extracts a high-frequency image H from the input image F (step S22). Furthermore, the image synthesizing unit 13 synthesizes the converted low-frequency image F' and the high-frequency image H (step S23). In this case, by adaptively changing a synthesizing method of ensuring the visibility of the converted low-frequency image F' and the high-frequency image H, the image synthesizing unit 13 synthesizes these images.

As described above, according to the present exemplary embodiment, the low-frequency image converting unit 11 converts an input image into a compressed image having a narrower dynamic range than the input image. Further, the high-frequency image extracting unit 12 extracts a high-frequency image from the input image. Furthermore, by adaptively changing the synthesizing method of ensuring the visibility of images to synthesize, the image synthesizing unit 13 synthesizes the compressed image and the high-frequency image. Consequently, it is possible to compress the dynamic range for which the visibility of a low-frequency image is ensured, while preserving a high-frequency image.

More specifically, the low-frequency image converting unit 11 converts an input image by applying HE to the input image and, consequently, it is possible to clarify the contrast of a low-frequency image even when the dynamic range is compressed, so that it is possible to ensure the visibility. Further, the image synthesizing unit 13 synthesizes the high-frequency image extracted by the high-frequency image extracting unit 12 and the compressed image, so that it is possible to ensure the visibility of the high-frequency component of the input image. Furthermore, the image synthesizing unit 13 adaptively changes the synthesizing method of ensuring the visibility of images to synthesize, so that it is possible to ensure the visibility of images which may lose the visibility when the images are simply synthesized.

Still further, when a value of a pixel in a HE image exceeds a predetermined threshold, the image synthesizing unit 13 synthesizes an image obtained by weakening a high-frequency component of a high-frequency image matching the pixel, and the HE image. Consequently, it is possible to prevent information of the HE image from being hidden by edge information.

In addition, as a method of improving the visibility, a method of applying AHE may be adopted. However, AHE has a problem that the relationship between the degrees of brightness between blocks cannot be preserved. For example, when each block to which AHE is applied is grouped, there is a problem that a seam occurs between each block. However, according to the present exemplary embodiment, edge information is captured in the entire image, so that it is possible to avoid a problem that a seam occurs between each block.

Second Exemplary Embodiment

FIG. 4 is a block diagram illustrating an example of an image dynamic range compression system according to a second exemplary embodiment of the present invention. In addition, the same configuration as in the first exemplary embodiment will be assigned the same reference numerals as in FIG. 1, and only differences will be described. An image dynamic range compression system according to the present exemplary embodiment has a low-frequency image converting unit 11, a high-frequency image extracting unit 12, an image synthesizing unit 13a and a registration/geometric converting unit 14.

Similar to the first exemplary embodiment, the high-frequency image extracting unit 12 extracts a high-frequency image H1 (hereinafter, also referred to as simply "high-frequency image H1") from an input image F1 (hereinafter, also referred to simply as "input image F1") of a wide dynamic range. Further, in addition to the input image F1, the high-frequency image extracting unit 12 extracts a high-frequency image H2 from another input image F2 obtained by capturing an image of the same subject as that from the input image F1. That is, the high-frequency image extracting unit 12 extracts the high-frequency image H2 also from another input image F2 obtained by capturing an image of the same subject as the input image F1. In addition, the method of extracting the high-frequency image H1 from the input image F1, and the method of extracting the high-frequency image H2 from the input image F2 may be the same or may be different.

An example of the input image F2 includes a visible light image. Meanwhile, the visible light image is an image recording light of a wavelength which people can perceive (that is, a wavelength different from infrared ray which people cannot perceive). Examples of the visible light image include an image captured by a camera (such as a digital camera). In addition, the input image F2 is by no means limited to a visible light image. For example, the input image F2 may be an infrared image (temperature information) being the same subject as the input image F1 and having different temperature information.

The registration/geometric converting unit 14 generates an image H (hereinafter, also referred to as "high-frequency image H") obtained by synthesizing another high-frequency image H2 extracted from an image obtained by capturing an image of the same subject as the input image F1, with the high-frequency image H1 extracted from the input image F1. Meanwhile, there is generally the disparity between images captured by different imaging devices, and therefore coordinates corresponding to the same position of the subject do not match. Hence, the registration/geometric converting unit 14 geometrically deforms the high-frequency image H2 extracted from the input image F2, and registers (aligns there positions of) the high-frequency image H1 extracted from the input image F1 and the high-frequency image H2. Further, the registration/geometric converting unit 14 generates the high-frequency image H by synthesizing both registered images.

The registration/geometric converting unit 14 uses a gradient method for example for geometrically conversion and registration of both images. Hereinafter, conversion and registration are also called "registration and the like"). More specifically, a conversion parameter of enlarging or reducing the input image F2 to an image having the same number of pixels as the input image F1 and deforming the image in order to register the input image F1 is M. In this case, the registration/geometric converting unit 14 may specify M which minimizes the sum of the absolute values of the differences between pixel values of corresponding pixels of an image W (F2,M) obtained by deforming the input image F2 and the input image F1 in the entire image. Meanwhile, W(X,Y) is a function of outputting an image obtained by deforming an image X according to a conversion parameter Y. In addition, a method of performing geometric conversion and registration is by no means limited to the gradient method. For example, a method of performing geometric conversion and registration by comparing characteristic points of both images may be used. In addition, the gradient method and the method of registering both images by comparing characteristic points are widely known, and therefore will not be described in details.

As described above, the registration/geometric converting unit 14 synthesizes images other than the high-frequency image extracted from the input image F1 and, consequently, it is possible to capture edge information which cannot be extracted from the input image F1, so that it is possible to improve the visibility of the input image F1. For example, when the input image F1 is temperature information and the temperature at a portion which needs to be extracted as an edge has the same temperature as the surrounding, the high-frequency image extracting unit 12 cannot extract edge information from the input image F1. However, when edge information can be extracted from another input image F2, the registration/geometric converting unit 14 can capture edge information extracted from the input image F2 by the high-frequency image extracting unit 12, for the high-frequency image of the input image F1, so that it is possible to improve the visibility of the input image F1.

As described above, when a plurality of images are superimposed, the disparity is usually produced due to positions of a device which captures images and a subject. Therefore, when images are simply superimposed, there is a concern that a synthesized image is blurred. However, with present exemplary embodiment, the registration/geometric converting unit 14 performs geometric conversion and registration and, consequently, it is possible to correct misalignment of both images, therefore it is possible to ensure the visibility of an image even when a high-frequency image is superimposed on the image.

Further, the registration/geometric converting unit 14 performs registration and the like based on a high-frequency image extracted from a visible light image, so that it is possible to capture an edge portion according to an image (that is, the outline of the subject) as human's eyes view. Consequently, it is possible to capture the edge portion based on information (input image F2) which is more perceivable for people and, therefore, it is possible to improve the visibility of the input image F1.

In addition, although an example has been described in the above description where the input image F2 is a visible light image, the content of the input image F2 is by no means limited to a visible image. The input image F2 may be a different image from which an outline (edge information) of the subject of the input image F1 can be extracted. For example, the input image F2 may be a different infrared image having different temperature information from the input image F1.

Further, a case has been described in the above description where the registration/geometric converting unit 14 performs registration and the like based on two images of the high-frequency image extracted from the input image F1 and the high-frequency image extracted from the input image F2. The number of images for which the registration/geometric converting unit 14 performs registration and the like is by no means limited to two, and may be three or more.

Further, the registration/geometric unit 14 may calculate a registration reliability R(x,y) representing the degree of accuracy of registration for each pixel (x,y) of the generated high-frequency image H. For example, the registration/geometric converting unit 14 may calculate the difference between corresponding pixels of images which are registered (for example, the high-frequency image H1 and the high-frequency image H2), and calculate the reciprocal of the difference as the registration reliability R(x,y) for the pixels. In addition, the method which the registration/geometric converting unit 14 uses to calculate the registration reliability R(x,y) is by no means limited to the above method.

A method of calculating the registration reliability R may be other method as long as the method can calculate the degree of accuracy of the registration.

Similar to the first exemplary embodiment, by adaptively changing a synthesizing method of ensuring the visibility of the converted low-frequency image F1' and the high-frequency image H, the image synthesizing unit 13a synthesizes these images. Further, in addition to the synthesizing method described in the first exemplary embodiment, the image synthesizing unit 13a may change a synthesizing method according to the registration reliability R calculated by the registration/geometric converting unit 14.

When the high-frequency image H is superimposed on the converted low-frequency image F1' based on pixels of a low registration reliability R, indistinctness due to misalignment of both images is highly likely to occur. Hence, the image synthesizing unit 13a blurs the converted low-frequency image F1' around, for example, a pixel having a lower registration reliability R than a predetermined threshold, and synthesizes the converted low-frequency image F1' and the high-frequency image H using the blurred pixel value. The image synthesizing unit 13a may blur the converted low-frequency image F1' by, for example, applying the lowpass filter. In addition, the method of blurring the converted low-frequency image F1' is by no means limited to a method of applying the lowpass filter, and may be other method.

As described above, by blurring an area of the converted low-frequency image F1' matching an area of a low registration reliability R, it is possible to make misalignment of images occurring when the images are superimposed less distinct. Consequently, it is possible to prevent a decrease in the visibility of the input image F1.

Further, the image synthesizing unit 13a may calculate a pixel value G(x,y) in an image G obtained by blurring the converted low-frequency image F1', using the following equation 1.

$$G(x,y)=\beta(x,y)\cdot F1'(x,y)+(1-\beta(x,y))\cdot Z(x,y) \quad \text{(Equation 1)}$$

Meanwhile, an image Z is an image which is blurred by convoluting a filter matrix B of a pixel size (for example, 11×11) set in advance in the image F1'. Further, $\beta(x,y)$ is a weighting value which changes in the range of [0,1], and becomes higher as the value of the registration reliability R(x,y) is greater. The image synthesizing unit 13a can reduce the influence of the lowpass filter more as the registration reliability R(x,y) is higher by using equation 1 when the image G is generated, and, by contrast with this, can increase the influence of the lowpass filter more for pixels having a lower registration reliability R(x,y). That is, by generating the image G using equation 1, the image synthesizing unit 13a can blur the converted low-frequency image F1' according to the registration reliability R(x,y) per pixel.

In addition, processing performed by the low-frequency image converting unit 11 is the same as that in the first exemplary embodiment, and therefore will be not described.

The low-frequency image converting unit 11, the high-frequency image extracting unit 12, the image synthesizing unit 13a and the registration/geometric converting unit 14 are realized by a CPU of a computer which operates according to a program (image dynamic range compressing program).

Further, the low-frequency image converting unit 11, the high-frequency image extracting unit 12, the image synthesizing unit 13a and the registration/geometric converting unit 14 may be realized by dedicated hardwares, respectively.

Figure 5:
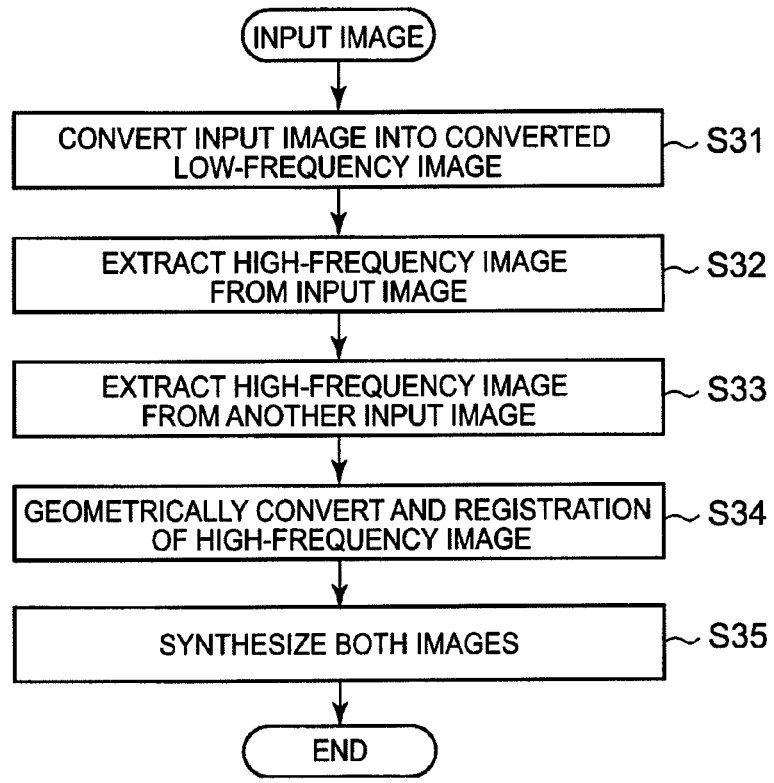
FIG. 5 It depicts a flowchart illustrating an example of processing according to the second exemplary embodiment.

Next, the operation will be described. FIG. 5 is an explanatory view illustrating an example of image dynamic range compressing processing according to the second exemplary embodiment. First, the low-frequency image converting unit 11 converts the input image F1 into a converted low-frequency image F1' (step S31). Further, the high-frequency image extracting unit 12 extracts a high-frequency image H1 from the input image F1 (step S32). Furthermore, the high-frequency image extracting unit 12 extracts a high-frequency image H2 from the input image F2 (x', y') (step S33). The registration/geometric converting unit 14 geometrically deforms the high-frequency image H2 and performs registration and the like for the high-frequency image H2 with respect to the high-frequency image H1 (step S34). Further, the registration/geometric converting unit 14 generates the high-frequency image H by synthesizing both images which are registered. Furthermore, the image synthesizing unit 13a synthesizes the converted low-frequency image F1' and the high-frequency image H (step S35).

In light of the above, according to the present exemplary embodiment, in addition to the processing in the first exemplary embodiment, the registration/geometric converting unit 14 generates the high-frequency image H which is registered to an image obtained by geometrically converting the high-frequency image H2 extracted from the input image F2 obtained by capturing an image of the same subject as the input image F1, and the high-frequency image H1 extracted from the input image F1. Hence, in addition to the effect of the first exemplary embodiment, it is possible to capture edge information which cannot be extracted from the input image F1, using the high-frequency image H2 and, consequently, it is possible to improve the visibility of the input image F1.

Further, the registration/geometric converting unit 14 calculates the registration reliability R, and the image synthesizing unit 13a changes the synthesizing method according to the registration reliability R. More specifically, the image synthesizing unit 13a synthesizes an image obtained by weakening a high-frequency component of the converted low-frequency image F1' matching the high-frequency image H according to the registration reliability R of the high-frequency image H, and the high-frequency image H. Consequently, it is possible to make misalignment in synthesizing less distinct. That is, it is possible to prevent a decrease in the visibility of the input image F1.

Further, the registration/geometric converting unit 14 performs registration and the like based on a high-frequency image extracted from a visible light image. Consequently, it is possible to capture the edge portion according to an image (that is, the outline of a subject) as human's eyes view and, consequently, improve the visibility of the input image F1.

Figure 6:
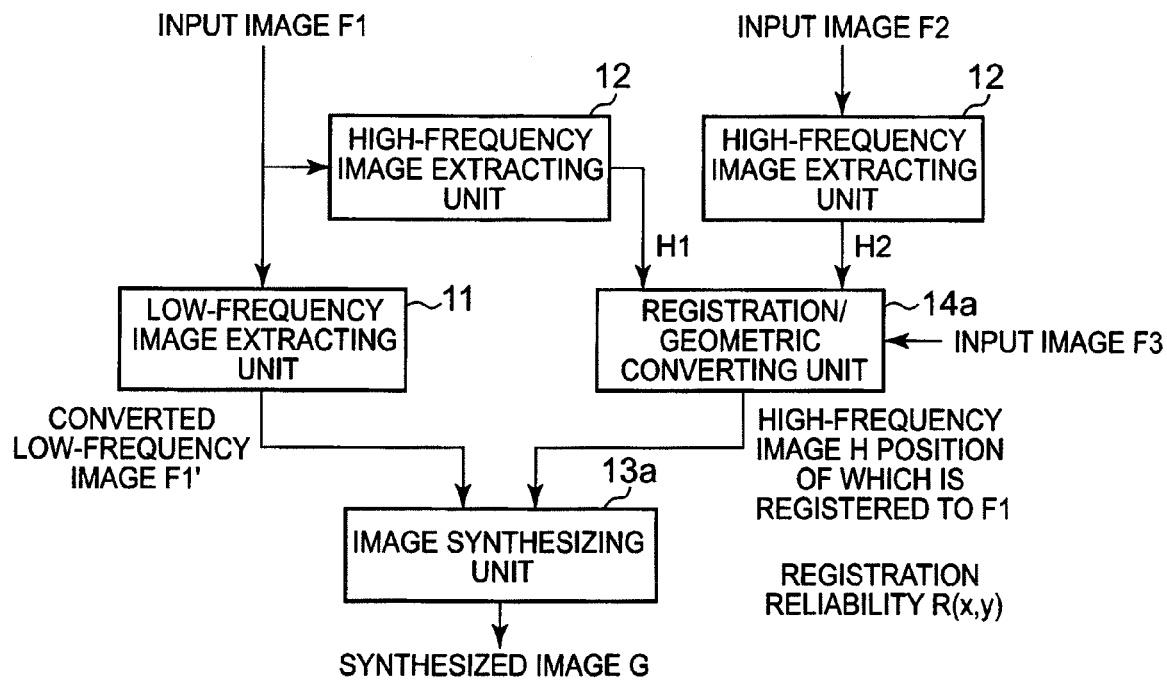
FIG. 6 It depicts a block diagram illustrating an example of an image dynamic range compression system according to a modification example in the second exemplary embodiment.

Next, a modified example of the present exemplary embodiment will be described. FIG. 6 is a block diagram illustrating a modified example of an image dynamic range compression system according to the second exemplary embodiment of the present invention. In addition, the same configuration as in the second exemplary embodiment will be assigned the same reference numerals as in FIG. 4, and will not be described. A registration/geometric converting unit 14a according to the present modified example differs from the registration/geometric converting unit 14 according to the second exemplary embodiment in performing registration and the like for an input image F3 received without the high-frequency image extracting unit 12. The other configurations are the same as those in the second exemplary embodiment.

The registration/geometric converting unit 14a receives as the input image F3 other edge information which allows the outline of a subject to be recognized, and performs registration and the like for the input image F3 with respect to a high-frequency image of the input image F1. The registration/geometric converting unit 14a receives, for example, an image recording an electromagnetic wave which represents the outline of the subject and is produced using a sound wave as another edge image. Further, the registration/geometric converting unit 14a performs registration and the like of this edge information and the high-frequency image of the input image F1. The above method also enables the edge portion to be captured, so that it is possible to further ensure the visibility of the input image F1.

In addition, FIG. 6 illustrates that the registration/geometric converting unit 14a performs registration and the like for the high-frequency image extracted from the input image F2 and the input image F3 with respect to the high-frequency image extracted from the input image F1. However, the images for which registration and the like are performed are by no means limited to the high-frequency image extracted from the input image F2 and the input image F3. The image for which the registration/geometric converting unit 14a performs registration and the like only needs to be at least one of the high-frequency image extracted from the input image F2 and the input image F3, and may be a combination of two or more images.

Figure 7:
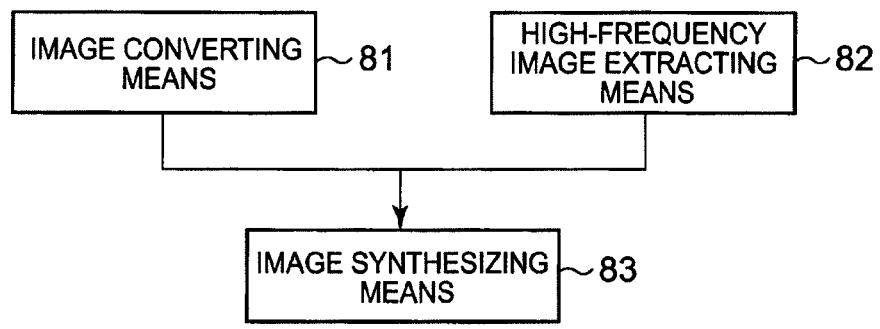
FIG. 7 It depicts a block diagram illustrating a minimum configuration of the present invention.
Figure 8:
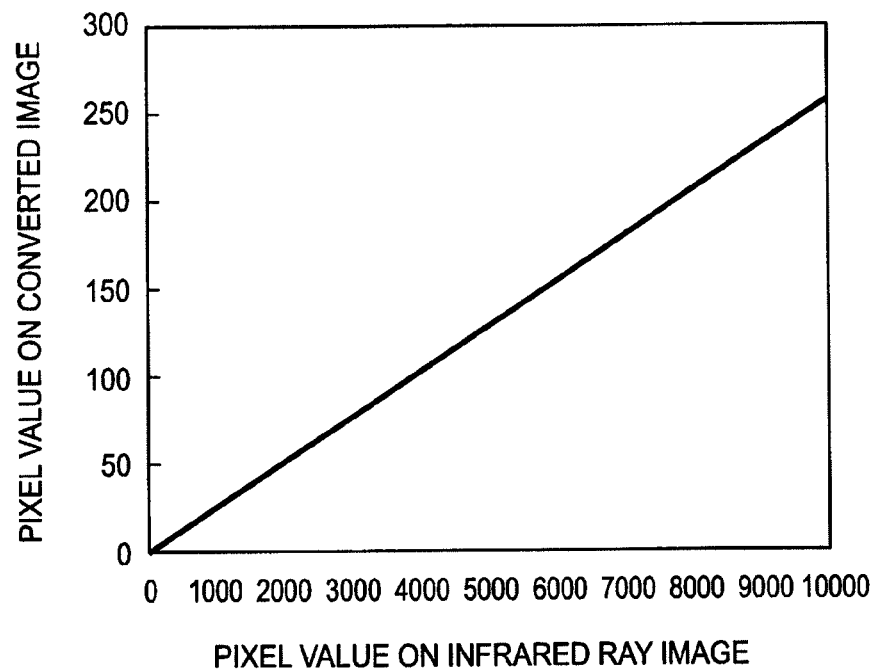
FIG. 8 It depicts an explanatory view illustrating a conversion function for performing linear scaling.
Figure 9:
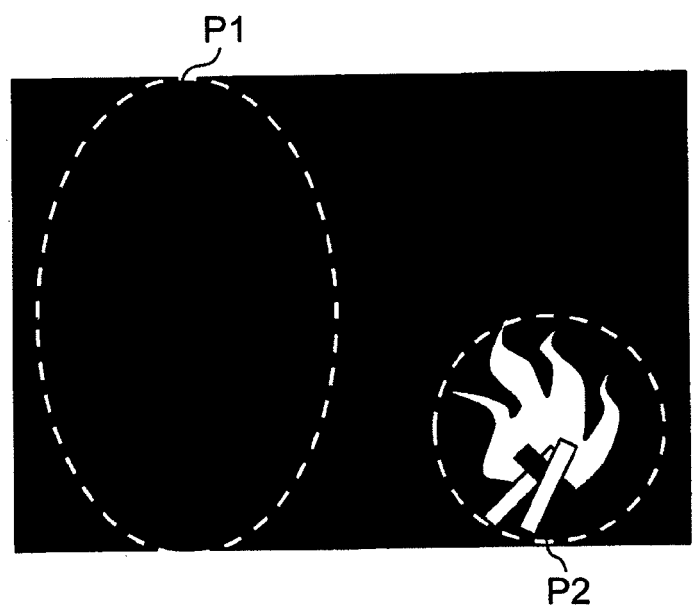
FIG. 9 It depicts an explanatory view illustrating an image converted by linear scaling.
Figure 10:
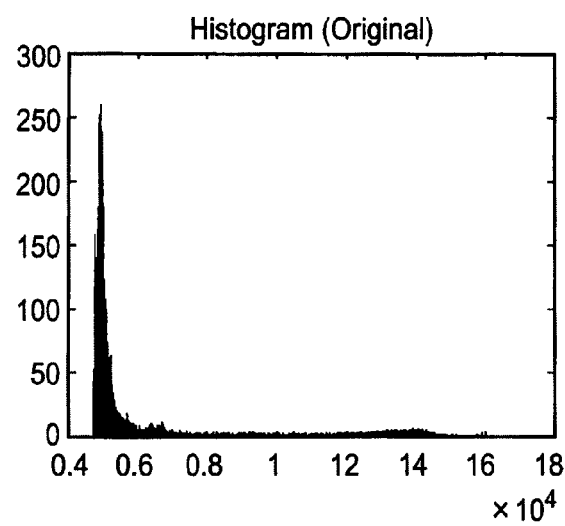
FIG. 10 It depicts an explanatory view illustrating a brightness histogram of an image before conversion.
Figure 11:
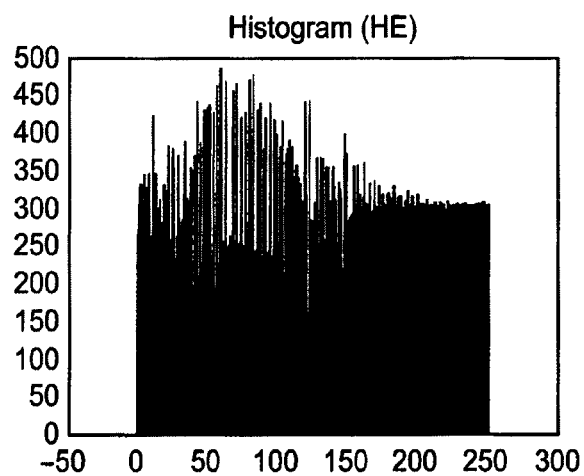
FIG. 11 It depicts an explanatory view illustrating a brightness histogram of an image after conversion.
Figure 12:
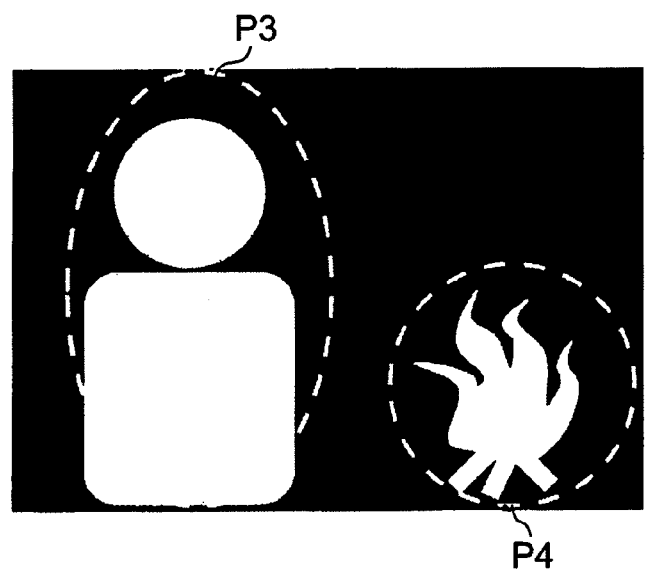
FIG. 12 It depicts an explanatory view illustrating an image converted by applying HE.
Figure 13:
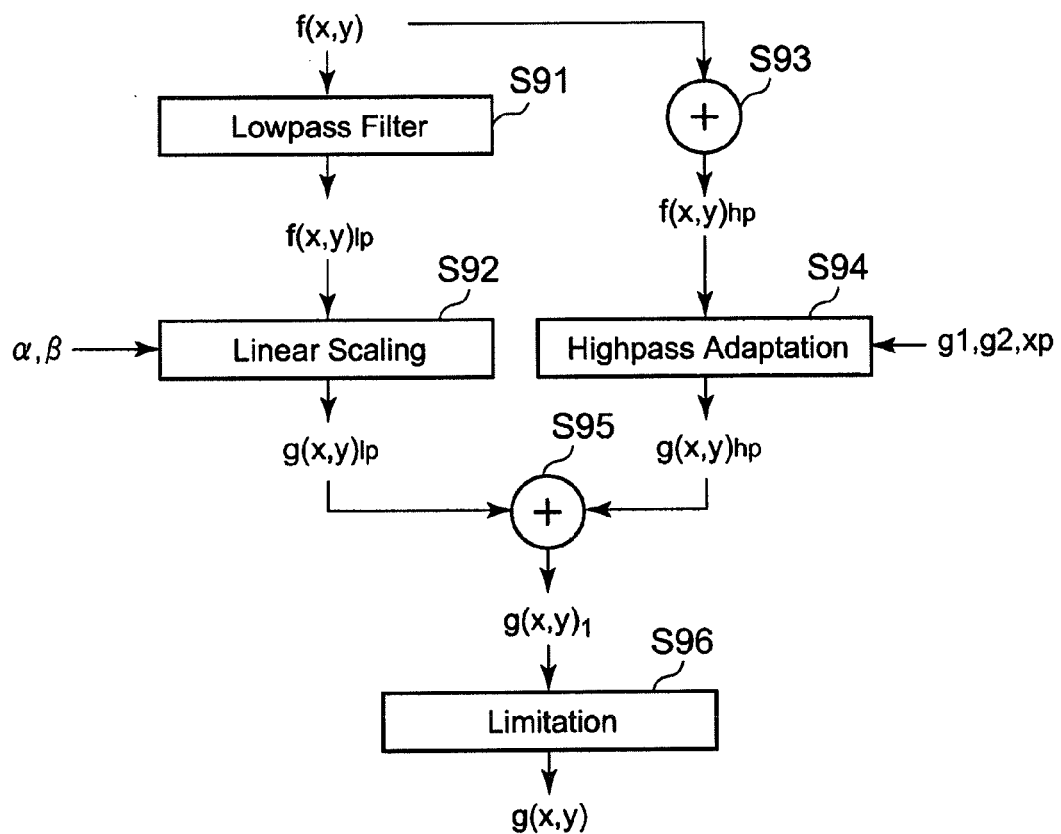
FIG. 13 It depicts a flowchart illustrating processing in MEAM.
Figure 14:
FIG. 14 It depicts an explanatory view illustrating an input image f(x,y).
Figure 15:
FIG. 15 It depicts an explanatory view illustrating a low-frequency image $f(x,y)_{lp}$ of an input image.

Next, the minimum configuration of the present invention will be described. FIG. 7 is a block diagram illustrating the minimum configuration of the present invention. The image dynamic range compression system according to the present invention has: image converting means 81 (for example, the low-frequency converting unit 11) which converts (for example, converts by applying HE) an input image (for example, the input image F) into a compressed image (for example, the HE image) having a narrower dynamic range than the input image; high-frequency image extracting means 82 (for example, the high-frequency image extracting unit 12) which extracts a high-frequency image (for example, the high-frequency image H) from the input image; and image synthesizing means 83 (for example, the image synthesizing unit 13) which synthesizes the compressed image and the high-frequency image.

By adaptively changing a synthesizing method (for example, a method of, when a pixel value in the HE image exceeds a predetermined threshold, multiplying a high-frequency component of the high-frequency image matching this pixel, with α) of ensuring the visibility of images to synthesize (for example, the input image F and the high-frequency image H), the image synthesizing means 83 synthesizes these images.

According to this configuration, it is possible to compress the dynamic range for which the visibility of a low-frequency image is also ensured while preserving a high-frequency image.

In addition, at least an image dynamic range compression system described below is disclosed in one of the above exemplary embodiments.

(1) The image dynamic range compression system comprises: image converting means (for example, the low-frequency image converting unit 11) which converts (for example, converts by applying HE) an input image (for example, the input image F) into a compressed image (for example, the HE image) which dynamic range is narrower than that of the input image; high-frequency image extracting means (for example, the high-frequency image extracting unit 12) which extracts a high-frequency image (for example, the high-frequency image H) from the input image; and image synthesizing means (for example, the image synthesizing unit 13) which synthesizes the compressed image and the high-frequency image, and, by adaptively changing a synthesizing method (for example, a method of, when a pixel value in the HE image exceeds a predetermined threshold, multiplying the high-frequency component of the high-frequency image matching this pixel, with α) of ensuring the visibility of images to synthesize (for example, the input image F and the high-frequency image H), the image synthesizing means synthesizes these images.

(2) The image dynamic range compression system comprises registration means (for example, the registration/geometric converting unit 14) which generates a high-frequency image (for example, the high-frequency image H) which is registered to (for example, registered by using a gradient method) of a high-frequency image (for example, the high-frequency image H1) extracted from an input image (for example, the input image F1) and the other high-frequency image (for example, the high-frequency image H2) extracted from an image (for example, the input image F2) obtained by capturing an image of the same subject as the input image, and the registration means generates a high-frequency image which is registered to the high-frequency image extracted from the input image and an image obtained by geometrically converting the other high-frequency image, and the image synthesizing means synthesizes the compressed image and the high-frequency image.

(3) With the image dynamic range compression system, the registration means calculates the registration reliability (for example, the registration reliability R) representing the degree of accuracy of registration for the generated high-frequency image, and the image synthesizing means (for example, the image synthesizing unit 13a) changes the synthesizing method of synthesizing the compressed image and the high-frequency image according to the registration reliability (for example, generates an image obtained by, for an area having a lower registration reliability R than a predetermined threshold, blurring an area of the converted low-frequency image F1' matching the area to synthesize the high-frequency image).

(4) With the image dynamic range compression system, the image synthesizing means (for example the image synthesizing unit 13a) synthesizes an image (for example, the image G generated using equation (1)) obtained by weakening a high-frequency component of the compressed image matching a high-frequency image according to the registration reliability of the high-frequency image, and the high-frequency image.

(5) With the image dynamic range compression system, the registration means generates a high-frequency image which is registered to a high-frequency image extracted from the input image and the other high-frequency image extracted from a visible image obtained by capturing an image of the same subject as the input image.

(6) With the image dynamic range compression system, the image converting means converts (for example, converts by applying HE) in order that a distribution of a gray level of the input image becomes to be flat.

(7) With the image dynamic range compression system, when a pixel value in a compressed image exceeds a predetermined threshold, the image synthesizing means synthesizes an image obtained by weakening a high-frequency component of a high-frequency image matching the pixel, and the compressed image.

(8) With the image dynamic range compression system, the image synthesizing means generates a pseudo color image obtained by converting each pixel of a compressed image into a color determined according to a pixel value, and changes a brightness component of a pseudo color image according to the intensity of the high-frequency component of the high-frequency image matching the compressed image (for example, sets the brightness higher for a pixel of a more intense high-frequency component).

Although the present invention has been described above with reference to the exemplary embodiments and the example, the present invention is by no means limited to the above exemplary embodiments and example. The configuration and details of the present invention can include various changes that one of ordinary skill in the art can understand within the scope of the present invention.

This application claims priority to Japanese Patent Application No. 2009-193123, filed Aug. 24, 2009, which is herein incorporated by reference in its entirety.

INDUSTRIAL APPLICABILITY

The present invention is suitably applied to an image dynamic range compression system which compresses an image of a wide dynamic range to an image of a narrow dynamic range.

REFERENCE SIGNS LIST

11 LOW-FREQUENCY IMAGE CONVERTING UNIT
12 HIGH-FREQUENCY IMAGE EXTRACTING UNIT
13, 13a IMAGE SYNTHESIZING UNIT
14, 14a REGISTRATION/GEOMETRIC CONVERTING UNIT

The invention claimed is:

1. An image dynamic range compression system comprising:
    an image converting unit configured to convert an input image into a compressed image which dynamic range is narrower than that of the input image;
    a high-frequency image extracting unit which configured to extract a high-frequency image from the input image; and
    an image synthesizing unit which configured to synthesize the compressed image and the high-frequency image,
    a registration unit configured to generate a high-frequency image that is registered to a high-frequency image extracted from the input image and another high-frequency image extracted from an image obtained by capturing an image of a same subject as the input image,
    wherein, the image synthesizing unit is further configured to synthesize the images by adaptively changing a synthesizing method of ensuring a visibility of images to synthesize,
    the registration unit is further configured to generate the high-frequency image that is registered to the high-frequency image extracted from the input image and an image obtained by geometrically converting the another high-frequency image,
    the image synthesizing unit is further configured to synthesize the compressed image and the registered high-frequency image,
    the registration unit is further configured to calculate registration reliability representing a degree of accuracy of registration for the generated high-frequency image, and the image synthesizing unit is further configured to change the synthesizing method for the compressed image and the high-frequency image according to the registration reliability.

2. The image dynamic range compression system according to claim 1, wherein the image synthesizing unit is further configured to synthesize an image obtained by weakening the high-frequency component of a compressed image matching the high-frequency image according to the registration reliability, and the high-frequency image.

3. The image dynamic range compression system according to claim 1, wherein the registration unit is further configured to generate the high-frequency image that is registered to the high-frequency image extracted from the input image and another high-frequency image extracted from a visible light image obtained by capturing an image of a same subject as the input image.

4. The image dynamic range compression system according to claim 1, wherein the image converting unit is further configured to convert the input image in order that a distribution of a gray level of the input image becomes to be flat.

5. The image dynamic range compression system according to claim 1, wherein, when a value of a pixel in the compressed image exceeds a predetermined threshold, the image synthesizing unit synthesizes an image obtained by weakening a high-frequency component of the high-frequency image which includes the pixel, and the compressed image.

6. The image dynamic range compression system according to claim 1, wherein the image synthesizing unit is further configured to generate a pseudo color image obtained by converting each pixel of the compressed image into a color determined according to a pixel value, and to change a brightness component of the pseudo color image according to an intensity of a high-frequency component of the high-frequency image,
    wherein the high-frequency image corresponds to the compressed image.

7. An image dynamic range compressing method comprising:
    converting an input image into a compressed image which dynamic range is narrower than that of the input image;
    extracting a high-frequency image from the input image;
    synthesizing the compressed image and the high-frequency image by adaptively changing a synthesizing method of ensuring a visibility of images to synthesize;
    generating a high-frequency image that is registered to a high-frequency image extracted from the input image and another high-frequency image extracted from an image obtained by capturing an image of a same subject as the input image;
    generating the high-frequency image that is registered to the high-frequency image extracted from the input image and an image obtained by geometrically converting the another high-frequency image;
    synthesizing the compressed image and the registered high-frequency image; calculating registration reliability representing a degree of accuracy of registration for the generated high-frequency image; and
    changing the synthesizing method for the compressed image and the high-frequency image according to the registration reliability.

8. A non-transitory computer readable information recording medium storing a program which, when executed by a processor, performs a method comprising:
    converting an input image into a compressed image which dynamic range is narrower than that of the input image;
    extracting a high-frequency image from the input image;

synthesizing the compressed image and the high-frequency image while adaptively changing a synthesizing method of ensuring a visibility of images to synthesize;

generating a high-frequency image that is registered to a high-frequency image extracted from the input image and another high-frequency image extracted from an image obtained by capturing an image of a same subject as the input image;

generating the high-frequency image that is registered to the high-frequency image extracted from the input image and an image obtained by geometrically converting the another high-frequency image;

synthesizing the compressed image and the registered high-frequency image; calculating registration reliability representing a degree of accuracy of registration for the generated high-frequency image; and changing the synthesizing method for the compressed image and the high-frequency image according to the registration reliability.

* * * * *